US008253552B2

(12) United States Patent
Axnix et al.

(10) Patent No.: US 8,253,552 B2
(45) Date of Patent: Aug. 28, 2012

(54) METHOD AND DEVICE FOR CONFIGURING FUNCTIONAL CAPABILITIES IN A DATA PROCESSING SYSTEM

(75) Inventors: Christine Axnix, Boeblingen (DE); Martin Eckert, Boeblingen (DE); Juergen Probst, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 493 days.

(21) Appl. No.: 12/478,960

(22) Filed: Jun. 5, 2009

(65) Prior Publication Data

US 2009/0303030 A1    Dec. 10, 2009

(30) Foreign Application Priority Data

Jun. 9, 2008 (EP) .................... 08157825

(51) Int. Cl.
*G08B 23/00* (2006.01)
(52) U.S. Cl. ...... 340/501; 340/506; 340/3.1; 340/539.1; 340/539.11; 340/539.13
(58) Field of Classification Search ............... 340/501, 340/506, 3.1, 539.1, 539.11, 539.13
See application file for complete search history.

(56) References Cited

U.S. PATENT DOCUMENTS

| 5,959,529 A * | 9/1999 | Kail, IV ............ 340/539.12 |
| 5,982,899 A | 11/1999 | Probst |
| 6,928,339 B2 | 8/2005 | Barker |
| 7,194,616 B2 | 3/2007 | Axnix et al. |
| 7,257,416 B2 | 8/2007 | Lee et al. |
| 2003/0008661 A1 | 1/2003 | Joyce et al. |

OTHER PUBLICATIONS

IBM eServer zSeries 890 Technical Introduction, IBM Redbook, published by IBM Corporation, SG224-6310-00, May 2004.
Probst et al "Flexible Configuration and Concurrent Upgrade for the IBM eServer z900", IBM Journal of Research and Development, vol. 46, No. 4/5, Jul./Sep. 2002, pp. 551-558.
Baitinger et al. "System Control Structure of the IBM eServer z900", IBM Journal of Research and Development, vol. 46, No. 4/5, Jul./Sep. 2002.
IP.COM, Aug. 24, 2006 IPCOM000139433D, "Network Independent, Fast, Flexible, Granular Temporary Capacity", pp. 1-3.

* cited by examiner

*Primary Examiner* — Daryl Pope
(74) *Attorney, Agent, or Firm* — Steven Chiu

(57) ABSTRACT

Configuring functional capabilities in a data processing system comprising entitlement data in a non-volatile storage. The position of the data processing system is determined. Based on said position, functional capabilities are changed based on position information comprised in the entitlement data. Changing functional capabilities consists of enabling functional capabilities, disabling functional capabilities, and both enabling and disabling functional capabilities.

20 Claims, 15 Drawing Sheets

FIG.12

RULE DATABASE 1160

| FUNCTION 1210 | POSITION INFO 1220 | VIOLATION RULES 1230 | 1240 |
|---|---|---|---|
| -FEATURE NAME<br>-#PROCESSORS<br>-# AND TYPE OF IO<br>-MEMORY SIZE<br>-PERFORMANCE<br>-... | -INDEPENDENT OF POS OR<br>-COORDINATES+RADIUS OR<br>-MAP AREA I,II,III, OR<br>-... | -N/A<br>-DISABLE FUNCTION<br>-(AFTER X MINUTES)<br>-ALERT MANUFACTURER<br>-INVOKE PENALTY BILLING<br>-... | FUNCTION ENABLED? ←1200 |
| -FEATURE NAME<br>-#PROCESSORS<br>-# AND TYPE OF IO<br>-MEMORY SIZE<br>-PERFORMANCE<br>-... | -INDEPENDENT OF POS OR<br>-COORDINATES+RADIUS OR<br>-MAP AREA I,II,III, OR<br>-... | -N/A<br>-DISABLE FUNCTION<br>-(AFTER X MINUTES)<br>-ALERT MANUFACTURER<br>-INVOKE PENALTY BILLING<br>-... | FUNCTION ENABLED? ←1200 |
| ⋮ | ⋮ | ⋮ | ⋮ |
| -FEATURE NAME<br>-#PROCESSORS<br>-# AND TYPE OF IO<br>-MEMORY SIZE<br>-PERFORMANCE<br>-... | -INDEPENDENT OF POS OR<br>-COORDINATES+RADIUS OR<br>-MAP AREA I,II,III, OR<br>-... | -N/A<br>-DISABLE FUNCTION<br>-(AFTER X MINUTES)<br>-ALERT MANUFACTURER<br>-INVOKE PENALTY BILLING<br>-... | FUNCTION ENABLED? ←1200 |

METHOD AND DEVICE FOR CONFIGURING FUNCTIONAL CAPABILITIES IN A DATA PROCESSING SYSTEM

BACKGROUND

The present invention relates to the configuration of functional capabilities in a data processing system.

An important feature of computer systems is the ability to adjust the provided processing and memory capacity depending on workload requirements, or to provide backup capacity for disaster recovery situations. Modern computer systems such as the IBM System z provide the capability to activate and deactivate additional processing capacity concurrently to normal system operation—i.e. the computer system does not have to be shut down or an operating system restarted to make use of the changed configuration. On Demand processor and memory capacity needs more physical capacity installed than enabled on computer systems. As long as there is dormant physical capacity available such capacity can be activated as the customer need demands. Additional processing capacity can be implemented using temporary processing resources that can be activated and deactivated as required on top of a permanent base configuration.

To prevent unauthorized activation of dormant capacity the activation is usually protected by a control system utilizing encryption as well as further secure methods binding the entitlement data to a specific machine. For example, U.S. Pat. No. 5,982,899 describes a method utilizing an unchangeable unique identifier that may be located within an integrated circuit chip. Temporary resource activation can be under control of an encrypted certificate using this unchangeable unique identifier. The Capacity on Demand features of IBM System z are described in U.S. Pat. No. 7,194,616 and J. Probst et al. "Flexible configuration and concurrent upgrade for the IBM eServer z900", IBM J. Res. & Dev., Vol. 46, No 4/5, July/September 2002, pp. 551-558.

BRIEF SUMMARY

The invention is defined by the independent claims. Further advantageous embodiments of the present invention are defined by the dependant claims.

In one embodiment of the present invention is a method for configuring functional capabilities in a data processing system comprising entitlement data in a non-volatile storage comprising the steps of:
  determining the position of said data processing system;
  depending on said position enabling and/or disabling functional capabilities based on position information comprised in said entitlement data.

Another embodiment of the invention is a device for configuring functional capabilities in a data processing system comprising entitlement data in a non-volatile storage, the device comprising
  position detecting means for determining the position of said data processing system;
  means responsive to said position detecting means for enabling and/or disabling functional capabilities based on position information comprised in said entitlement data.

The fact that the entitlement data can be shipped as part of the data processing system and can be resident on the data processing system allows an implementation of the data processing system, wherein firmware controls enablement of functional capabilities without the need to go back to the data processing system manufacturer and/or seller with the position information and check for the entitlement at the time of activation. This means that the data processing system manufacturer and/or seller does not need to know where the data processing system is located at any given time. The entitlement data is self contained on the data processing system.

BRIEF DESCRIPTION OF THE SEVERAL VIEWS OF THE DRAWINGS

The present invention and its advantages are now described in conjunction with the accompanying drawings.

FIG. 12: Is a block diagram illustrating a rule database in accordance with the present invention;

DETAILED DESCRIPTION

Introduction

A state of the art computer system may be comprised of multiple processor books each of them providing processor and memory resources. The amount of resources may be identical or differ between the multiple processor books. All those resources may be combined to a single SMP (Symmetrical Multi Processor) system such that it does not matter how the enabled capacity is allocated from the physical capacity provided by multiple processor books, i.e. the entitlement for permanent and for temporary capacity is specified and charged at the system level.

Figure 1:
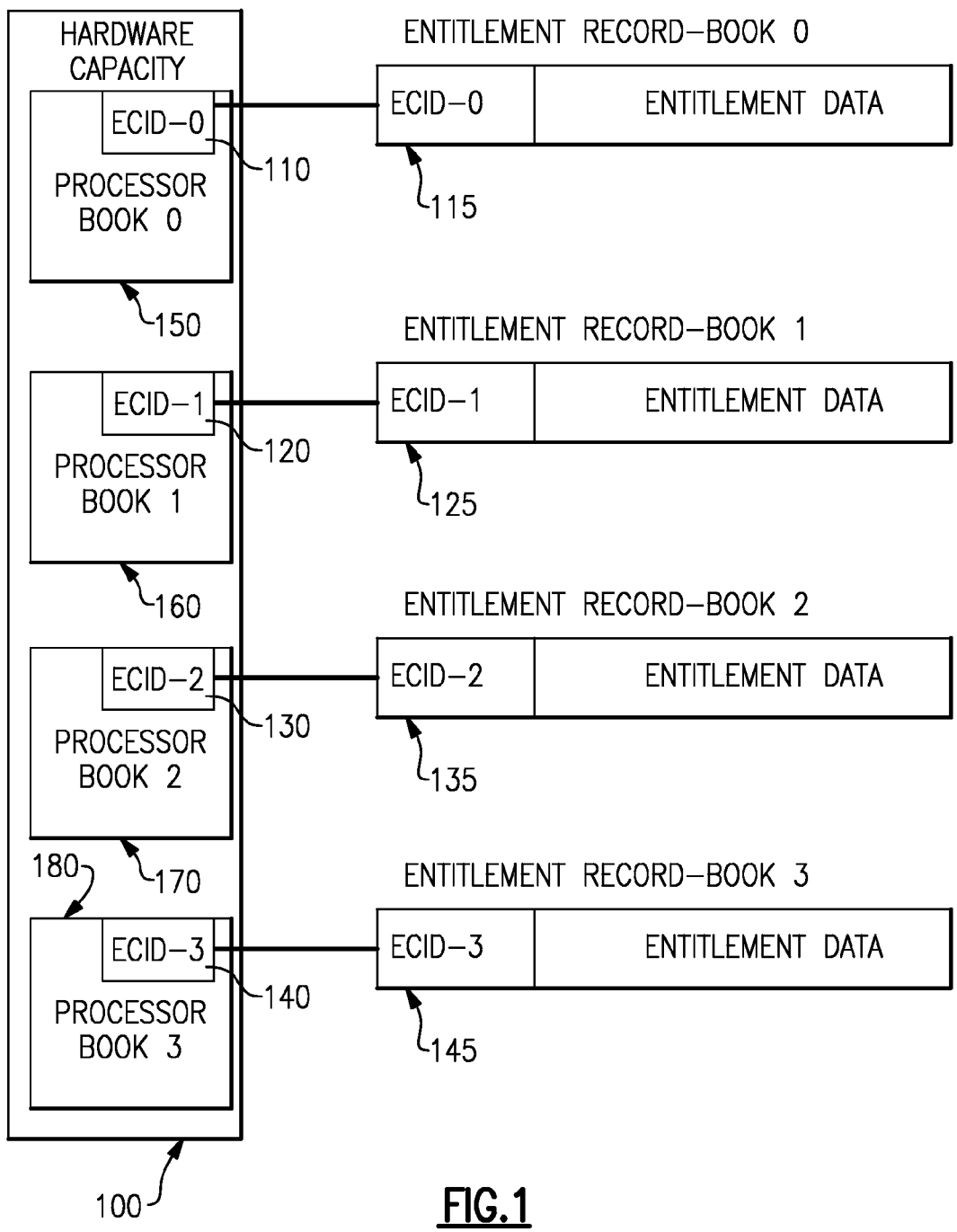
FIG. 1: Is a block diagram of a subsystem of a computer system.

The example implementation of a hardware capacity 100 of a computer system shown in FIG. 1 utilizes the unchangeable identifiers (ECID) 110, 120, 130, 140 of each single processor book 150, 160, 170, 180 to bind the entitlements for the physical resources of the corresponding processor books to their hardware implementation and prevent usage of the entitlement data contained in the associated entitlement records 115, 125, 135, 145 for other processor books residing in the same computer system or in a different computer system. Therefore, there is a one to one relationship between a particular processor book and the associated entitlement record.

There is one major disadvantage with this approach: Sometimes processor books need to be exchanged for repair or upgrade purposes. When a processor book is being exchanged carrying the ECID for the encrypted entitlement record this record also must be exchanged to match the ECID of the replacing book and a new entitlement record with the appropriate processor and memory definitions must be created and loaded into the machine. Since the data is machine configuration specific it cannot be stored as a generic record but must be created for example on-line utilizing the current authorization definition of the failing processor book. This needs on-line access to the critical asset protection system. Also the certificate of tokens concept described in IPCOM000139433D does not solve this problem.

Figure 2:
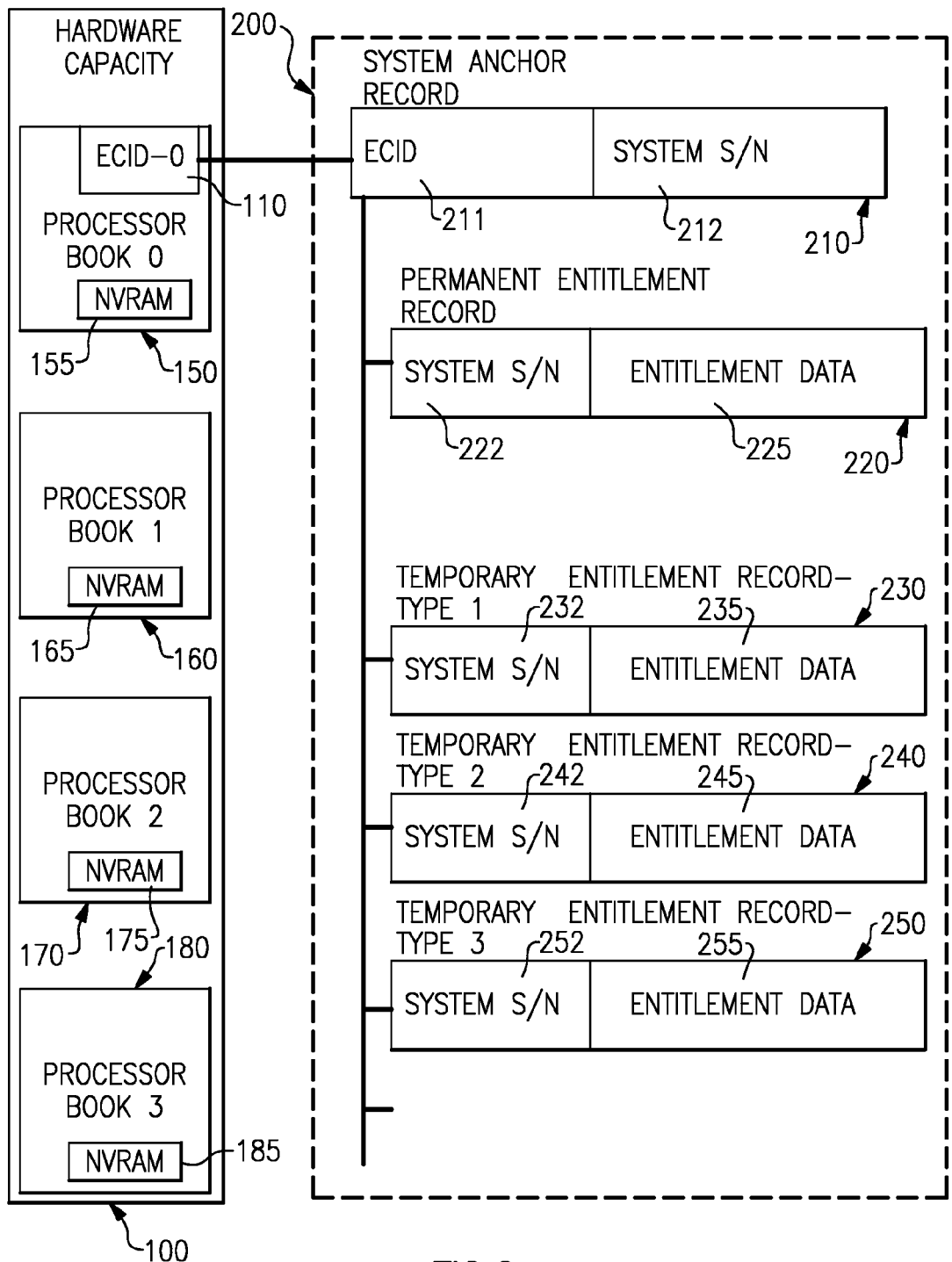
FIG. 2: Is a block diagram of a subsystem of a computer system suitable for the invention.

FIG. 2 shows the hardware capacity 100 of FIG. 1. The processor books 150, 160, 170, 180 contain non-volatile memory 155, 165, 175, 185 respectively, e.g. implemented by NVRAM (Non-volatile Random Access Memory) or flash memory. The content 200 of the non-volatile memory 155 of processor book 150 comprises a System Anchor record 210 and permanent and temporary entitlement records, e.g. the permanent entitlement record 220 and the temporary entitlement records 230, 240, 250 as shown. The System Anchor record 210 contains an ECID 211 and a system unique ID 212. An example for a system unique ID 212 could be the system serial number (S/N), which is assigned by the manufacturer of the computer system. The ECID 211 is unique and as being part of a chip it is unchangeable and cannot be cloned as long as the chip cannot be cloned by third party. The System Anchor record 210 links to the ECID 110 of the processor book 150 and is encrypted, e.g. via the asymmetric RSA (Rivest Shamir Adleman) cryptosystem. The System Anchor record 210 may be generated as suggested by U.S. Pat. No. 5,982,899. In that case, the System Anchor record 210 cannot be changed and it cannot be generated with a different system unique ID since the RSA private key is unknown to unauthorized people.

Entitlement records 220, 230, 240, 250 are linked to the System Anchor record 210 using the system unique ID 212 as linkage. Any number and type of entitlement records can be linked to the System Anchor record 210. The entitlement records 220, 230, 240, 250 are also encrypted and thus cannot be changed or generated without authorization. The entitlement records 220, 230, 240, 250 contain a unique identifier and specify resources at the system level and thus the total of resources is easy to calculate. The unique identifiers 222, 232, 242, 252 must be equal to the system unique identifier 212. The resources are specified by the entitlement records 220, 230, 240, 250 by their entitlement data 225, 235, 245, 255 respectively.

Generation of a System Anchor Record

Figure 3:
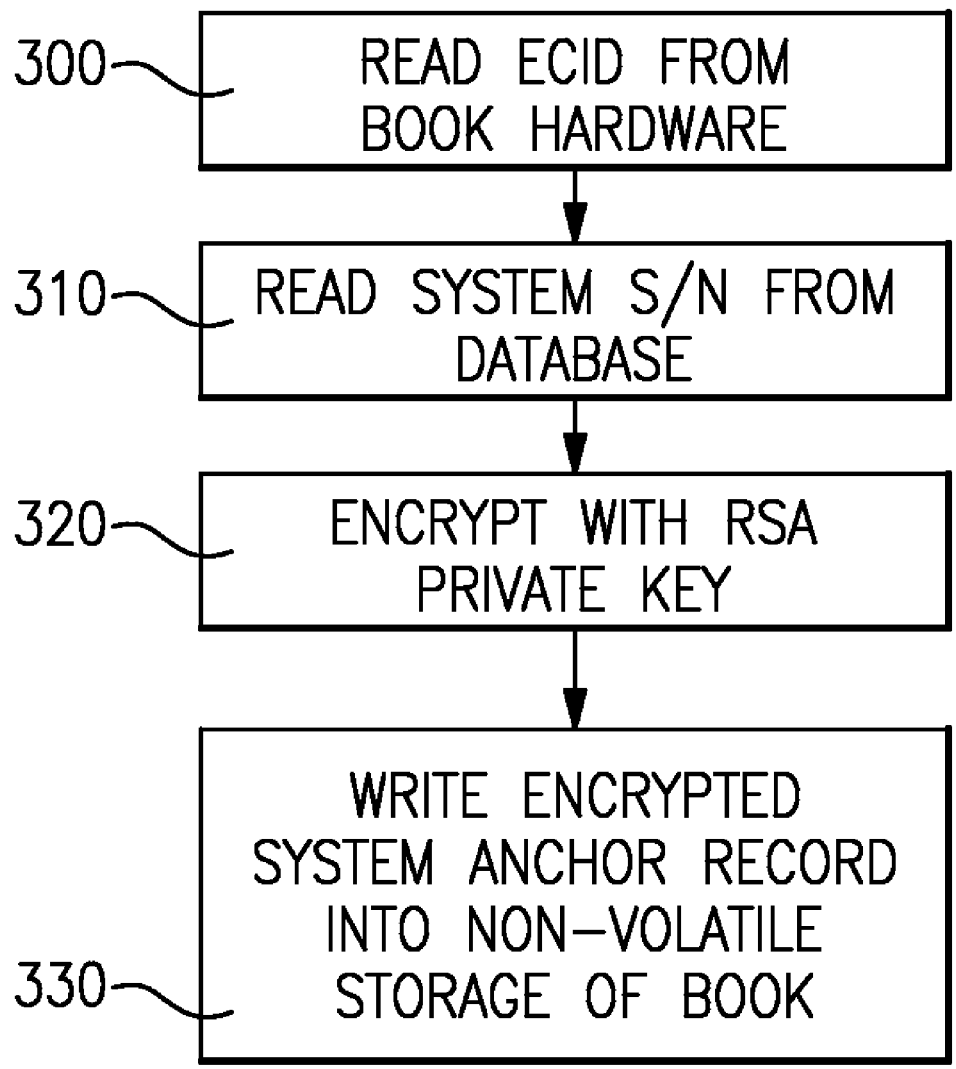
FIG. 3: Is a flow diagram illustrating a method for usage in computer system manufacturing.

The System Anchor Record 210 is built during manufacturing of the computer system. FIG. 3 illustrates this process. In step 300 an unchangeable identifier of some proprietary chip contained in a book of the computer system is read from the respective book hardware and used as the ECID 211. In step 310 the serial number of the computer system is retrieved from some manufacturing database and used as the system unique ID 212. The system serial number may or may not be encoded with the ECID 211 as suggested by U.S. Pat. No. 5,982,899. The resulting data reflecting the ECID 211 and the system unique ID 212 is encrypted with the private key utilizing RSA or another asymmetrical encryption algorithm in step 320. The encrypted data builds the System Anchor record 210, which is written in step 330 into a non-volatile storage of a book of the computer system.

The format of the System Anchor record 210 may be specific or a common record format may be used for the System Anchor Record 210 and for the Entitlement Records 220, 230, 240, 250 consisting of all elements needed for both types of records and utilizing only those elements needed for the respective record type. The entitlement records 220, 230, 240, 250 contain entitlements for exploitation of hardware capability and hardware capacity in the entitlement data 225, 235, 245, 255, e.g. the number and type of processors and the amount of memory available to the computer system user. The hardware capacity shipped may exceed the capacity purchased by the computer system user. For example, an entitlement record may be permanent as entitlement record 220, which means that its entitlements are permanent, or it may be temporary only as the entitlement records 230, 240, 250, which means that its entitlements are valid temporarily only.

Generation and Distribution of Entitlement Records

Figure 4:
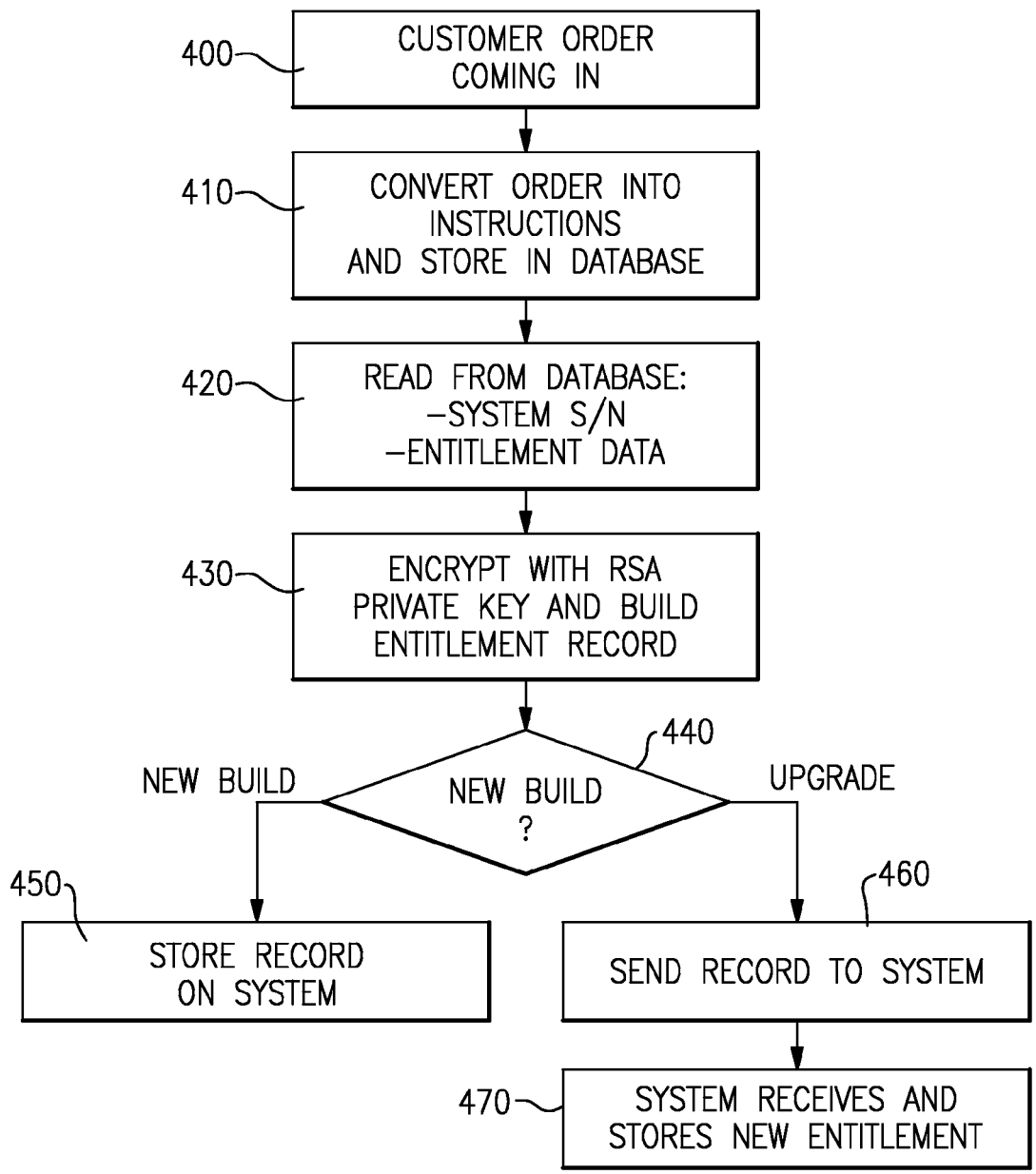
FIG. 4: Is a flow diagram illustrating a method to generate entitlement records.

FIG. 4 illustrates the generation and distribution of entitlement records. When the customer order for a computer system arrives at the manufacturer (step 400), then in step 410 the order data is converted into production and shipment instructions (e.g. processor capacity into required hardware capacity to be shipped and processor capacity to be enabled to exactly fulfill the order). The converted order data is then stored in a database. In case of an upgrade-order the computer system is already reflected in that database together with the system serial number. For a new order a system serial number may have to be assigned. From this database the system serial number and the entitlement data are retrieved in step 420 and then encrypted with the private key utilizing an asymmetric encryption algorithm like RSA in step 430. The resulting record from this process is called the Encrypted Entitlement Record. For new builds (step 440) the encrypted entitlement record is stored in some non-volatile storage of the new computer system in step 450. For upgrade orders the record is transferred in step 460 to the target computer system at the customer site where in step 470 the target computer system receives the data and stores it in some non-volatile storage. For example, the transfer can be performed via the Internet.

Processing of Entitlement Records

Figure 5:
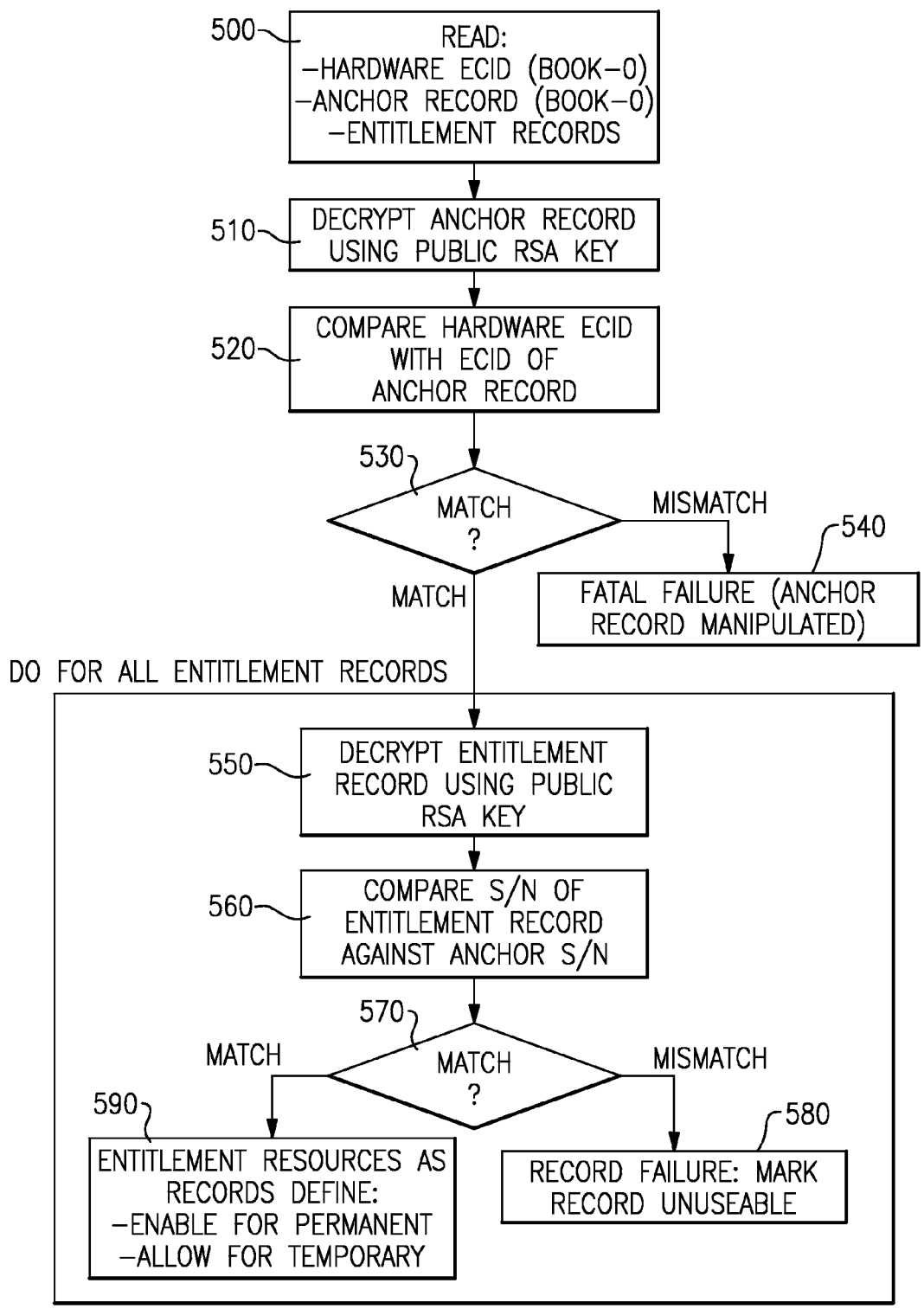
FIG. 5: Is a flow diagram illustrating a method for the verification of entitlement records.

Whenever the computer system initializes or when the customer or some automation tool decides to utilize temporary capacity the permanent and/or the temporary entitlement records need to be validated. It must be ensured that the entitlement records belong to the respective computer system. For validation the chain ECID-S/N-entitlement must be verified. The verification of the entitlements is illustrated in FIG. 5. In step 500 the computer system retrieves the hardware ECID directly from the hardware of processor book 150 and reads the anchor record from the non-volatile storage of processor book 150. Also the computer system reads all the entitlement records from the system non-volatile storage. In step 510 the computer system decrypts the anchor record and then verifies equivalence of the hardware ECID and the ECID stored in the anchor record in step 520. If a mismatch is found in step 530, this indicates manipulation and results in a fatal error in step 540. If a match is found in step 530 the correct system serial number is provided. Then the computer system continues with checking all entitlement records. In step 550 an entitlement record is decrypted using the public RSA key. Then in step 560 the entitlement record is checked by comparing the serial number (used as the system unique ID in the entitlement record) against the validated serial number of the anchor record. If a mismatch is found in step 570, then this indicates a manipulation of the entitlement record. Then the entitlement record is not accepted and marked 'unusable' in step 580. Only validated entitlement records will be accepted to enable system capacity in step 590.

Capacity entitled in permanent entitlement records is immediately enabled; capacity entitled in temporary entitlement records is made available to the customer for temporary upgrade whenever he decides to utilize this temporary capacity. The temporary upgrade and downgrade may be done manually or by automation to the extent as defined by the total of validated temporary entitlement records.

A simple embodiment only uses the non-volatile memory 155 of processor book 150 because the System Anchor record 210 only contains the value of ECID 110 as ECID 211. As long as processor book 150 stays in a configuration the other ECIDs 120, 130, 140 are not used. Whenever processor book 150 is replaced by a new processor book the ECID 110 is obsolete and needs to be replaced by the ECID of the new processor book as well as the System Anchor record 210 must be replaced by a new System Anchor record to reflect the new ECID.

Since the System Anchor record 210 refers to processor book 150 it is recommended to store the System Anchor record 210 in the non-volatile memory 155 of processor book 150 only. The entitlement records 220, 230, 240, 250 as system level configuration data, however, may not be stored in the non-volatile memories of the processor books but in some non-volatile system storage that is not exchanged as part of a processor book. An example is a hard disk storage of the computer system. This has the advantage that it is not required to transfer the entitlement records to the replacement hardware before the exchange. Another advantage is that is more difficult to clone the entitlement data and use it for a different computer system, for which it was not authorized by the manufacturer and/or seller of the computer system.

Instead of processor book 150 also one of the other processor books 160, 170, 180 could be used to store the system anchor record. But there is only one System Anchor record in use per computer system at the same time. For example, by defining an exchangeable component that is plugged in a dedicated slot of the computer system as the carrier of the System Anchor record, the management of the assignment of a System Anchor record to a particular computer system is simplified for the manufacturer and/or seller. With this convention, only the subset of the exchangeable components comprising System Anchor records needs to be tracked separately.

Instead of the ECID 110, also another unchangeable identifier stored in the computer system can be used. The advantage of using ECID 110 is that it is guaranteed that it is always available for the System Anchor record 210 in case the processor book 150 is not broken. Otherwise, if the unchangeable identifier is stored in a different component, the System Anchor record can be unusable when this component is broken. However, if an unchangeable identifier is used which is stored in a component which cannot be replaced, the problem solved by the temporary entitlement records would not exist. In that case, all entitlement records will be associated to the computer system directly as the unchangeable identifier is then always available unless the entire computer system is (at least temporarily) broken.

Temporary Capacity

In the preferred embodiments of the invention, the flexible temporary capacity upgrade/downgrade method and device for a computer system described in U.S. Pat. No. 7,194,616 are adapted accordingly. U.S. Pat. No. 7,194,616 introduces a so called Resource Controller that enables and disables processor capacity and other resources upon request. It enables the various resources up to a level as defined in Capacity Data Sets defining the maximum of permanent entitlements and the maximum of temporary entitlements. The entitlement records will be used as the Capacity Data Sets. The Capacity Data Sets are stored in a storage unit connected to a hardware console, which is part of the computer system.

This approach is not limited to protect resources of processor books. The entitlement records may include entitlements for I/O (input/output) adapters or other functions provided by the same computer system under the same system serial number, or separate entitlement records for such resources may be defined and linked to the System Anchor record.

The use of temporary capacity is under control of terms and conditions. Different types of temporary capacity with different terms and conditions for different purposes can be defined, e.g. one for backup capacity to be used for disaster recovery, or another one to be used for workload peaks. Appropriate use of temporary resources within the terms and conditions has to be enforced.

For example, for System z Capacity on Demand a set of temporary offerings is supported where each has its defined rules and limits, some of these rules and limits are specified in the order or in the billing system, some are hard coded in the System z firmware, and some are part of temporary entitlement records. However, each time a new offering type has to be introduced, the firmware needs to be changed because there are dedicated entitlement checking and backend processing paths for each offering type. Also some rules or terms and conditions even have to be enforced by manual intervention.

Figure 6:
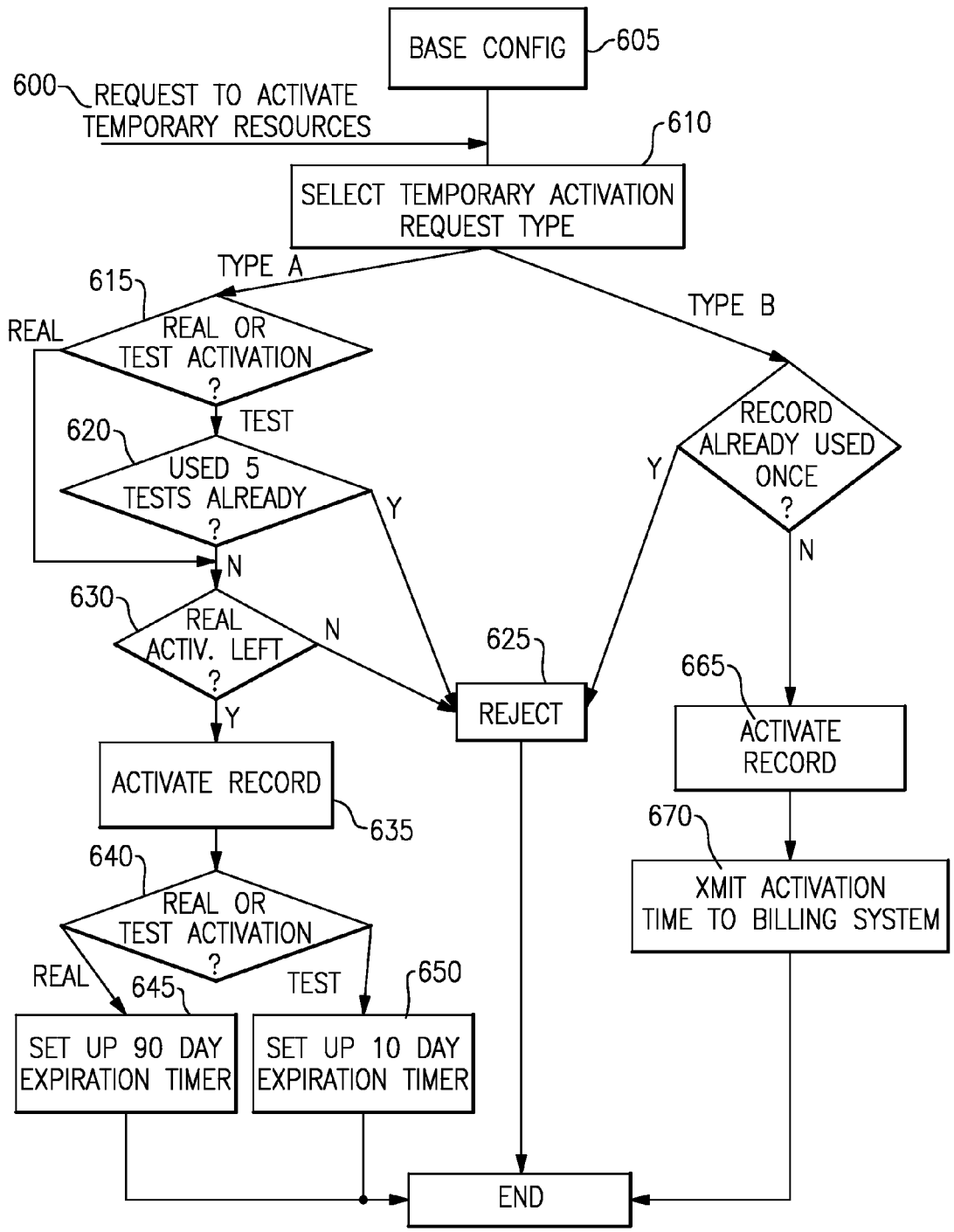
FIG. 6: Is a flow diagram illustrating a method to activate temporary capacity.

FIG. 6 shows how a request 600 to activate temporary capacity in addition to the base configuration 605 is handled by a System z computer system according to the state of the art. In step 610 the temporary activation request type is selected for the request 600 by the System z firmware. The following two example offerings are available at the computer system. Offering type A is an example for a pre-paid offering which can be activated at most 6 times, 5 of these for test purposes, one for a real activation, with a fixed expiration time of 10 days (for test) and 90 days (for real activation), respectively, which is controlled inside the machine. Offering type B is an example for a single use record for a post-paid offering, which requires the transmission of the activation time to the billing system outside of the machine. The type selection in step 610 will lead to the use of an entitlement record for the request 600.

For type A, the firmware will check in step 615 if the activation request is for test purposes or for a real activation. Then in step 620 it will check if the associated entitlement record was used already more than 5 times for test purposes already. If that is the case, then the request 600 will be rejected in step 625. Otherwise or in case the request 600 was for a real activation, the firmware will check if a real activation is left for the entitlement record in step 630. If not, then the request 600 will be rejected also in step 625. Otherwise, the entitlement record will be activated in step 635. As part of the actual activation, the firmware will check in step 640 whether this was a real or a test activation, and a timer will be established and started in steps 645 and 650, respectively, by the firmware. This timer will expire 10 or 90 days after the activation, respectively. Once the timer is expired, the temporary capacity associated to the entitlement record will be disabled by the firmware.

For type B, the firmware will check if the associated entitlement record was already used once in step 660. If that is the case, then the request 600 will be rejected in step 625. Otherwise the entitlement record will be activated in step 665. After the activation, the firmware will report the activation time to the billing system of the manufacturer and/or seller of the computer system in step 670. For example, such transmission can be performed using the Internet via a service processor and/or a hardware console of the computer system.

Generation of Temporary Entitlement Records

When a customer orders temporary capacity, the temporary capacity entitlement records are generated as described for the entitlement records above. For the preferred embodiment of the invention, the following input is needed for the generation of a temporary entitlement record:

- the system serial number of the target system which is retrieved e.g. from an order system database, and
- the desired entitlement data.

The desired entitlement data consists of a set of rules and corresponding limit values for the respective temporary capacity offering.

The selection of rules and limit values can be either done by the customer himself by showing him the complete list of rules that are supported in the machine, and let him decide which ones he wants to apply and what his limiting values should be, or the computer system manufacturer or seller could offer some pre-canned, pre-defined offerings that already contain "best practices" rules and limits to simplify the ordering process for the customer.

For example, on a control panel of an entitlement record generator the following limiting values can be selected as desired, wherein the offering signature flags specify which rules/limits are in effect:

Temporary Entitlement Record Generator

| MachineSN: | 00000000000MNXK4 | | | |
|---|---|---|---|---|
| UniqueRecordID | 06665801 | | | |
| Offering: | Type 02 | Flags | 00001001 | 00100000 |

CPU Entitlement Definitions

| maxCPU# | n/a | CPU tokens | n/a |
|---|---|---|---|
| maxCP_FC | n/a | | |
| maxSpeedSteps | n/a | | |
| maxMSU% | 250 | MSUtokens | n/a |

Specialty Engine Entitlement Definitions

| maxSAP# | 6 | SAP tokens | n/a |
|---|---|---|---|
| maxICF# | 6 | ICF tokens | n/a |
| maxIFL# | 8 | IFL tokens | n/a |
| maxzAAP# | 8 | zAAP tokens | n/a |
| maxzIIP# | 8 | zIIP tokens | n/a |

Expiration Conditions and Time Limits

| ExpirationDate | Aug. 31, 2007 | TimeExpiryGrace | 2 |
|---|---|---|---|
| #RealActivations | 1 | #RealActivationDays | 90 |
| #TestActivations | 0 | #TestActivationDays | n/a |

In the example, a temporary entitlement record for the System z computer system with the serial number (MachineSN) 00000000000MNXK4 is created. The temporary entitlement record is given a unique record identifier by the entitlement record generator, which allows to uniquely identifying this particular temporary entitlement record. This record identifier can be overwritten by the user, e.g. for generating refill records. The Offering type and flags field is used to uniquely identify the offering type with respect to its terms and conditions and for billing purposes. For example, billing windows can be defined as 24-hour windows. Tokens according to IPCOM000139433D are decremented at the end of each billing window. The offering type can also be used e.g. to encode descriptive text to be displayed on the computer system panels.

This record comprises enablement data for a maximum of 6 SAPs (System Assist Processors) to be used by the System z Channel Subsystem (CSS), a maximum of 8 zAAPs (z Application Assist Processors) for Java processing in an operating system, a maximum of 8 IIPs (Integrated Information Processors), a maximum of 6 ICFs (Internal Coupling Facilities), and a maximum of 8 IFLs (Integrated Facilities for Linux). For example, "IBM eServer zSeries 890 Technical Introduction", IBM Redbook, published by IBM Corporation, publication number SG24-6310-00, First Edition (May 2004), provides details for such System z computer system configurations.

The entitlement for CPU usage (standard Central Processors) to be used by the operating systems can be limited by the maximum number of CPUs plus their maximum speed delta (sub-capacity speed setting) relative to the permanent configuration (maxSpeedSteps), a MSU percentage, or a number of CP feature codes. MSU, sub-capacity settings, and CP feature codes are described e.g. in sections 1.3 and 1.4 of the above mentioned publication. The CP feature codes are used to encode the number of additional temporary CPs plus the number of permanent CPs with their changing speed (independent how many speed steps are added). The MSU percentage specifies how much MSU capacity relative to the permanent configuration can be added using this record. In this example, the maximum number of CPUs (maxCPU #), the maximum number of CP feature codes (MaxCP_FC) and the number of speed steps is not used for limiting CPU capacity, and therefore marked as n/a (not applicable). The percentage of purchased MSUs that can be added using this temporary entitlement record is 250%. This means that 250% of the permanent MSUs are added, resulting in a total of 250%+ 100%=350% MSUs (permanent plus temporary MSUs).

The temporary entitlement record expires on Aug. 31, 2007 (ExpirationDate). No tokens will be used for any of the physical resources. The temporary entitlement record can be activated once (# RealActivations) for 90 days (# RealActivationDays). This temporary entitlement record cannot be activated for test purposes (# TestActivations), and so the duration for the test activation is not applicable (# TestActivationDays). The TimeExpiryGrace field specifies that 2 grace days are available before this temporary entitlement record is automatically deactivated after the expiration date or when the maximum number of activation days (90 in this example) is exceeded.

After processing the input data, the control panel will display the following signature data for the generated temporary entitlement record and also include this signature in the temporary entitlement record itself:

Offering Signature 10000000 10111100 00000000 00000000 00000000

The signature flags provide the actual entitlement data of the temporary entitlement record, which was generated by the control panel for the input data. The '1' bits in the signature correspond one to one with the rule set that can be selected when generating temporary entitlement records. For example, the bits corresponding to fields where the user has entered 'n/a' are 0, meaning this rule is not in effect for this temporary entitlement record. This also means the corresponding entitlement field is unlimited. This could be used e.g. for specifying that a temporary entitlement record can be activated an unlimited number of times—by entering 'n/a' in the # RealActivations field. Bits corresponding to fields where the user has entered entitlement limits are set to '1', telling the computer system that the corresponding rule needs to be verified and enforced.

In addition, the control panel can provide comments regarding the validity of the temporary entitlement records. In the above example, a warning could be provided to decrease the number of SAPs and other speciality engines in order to provide the required capacity for the CPs, given the physical machine configuration of machine SN 00000000000MNXK4.

Temporary Entitlement Records

According to the preferred embodiment of the invention, a flexible, version controlled certificate structure to control the temporary capacity will be used. An offering signature tells how to interpret this certificate structure. This certificate structure represents a set of rules that can be used in an offering in any combination, independent of each other. These rules are represented by control fields which can be grouped into resource limit fields (e.g. maximum number of processors or another representation of the processing capacity that can be added), time limit fields (e.g. expiration date or number of days a record can be active), and consumable token fields (e.g. processor day tokens or number of times this record can be activated). All temporary capacity entitlements are controlled via the same record structure.

A computer system according to an embodiment of the invention understands all these rules and therefore no changes to the firmware of the computer system are required when a new offering with a new combination of rules is defined. Not all rules are necessarily used for any given offering. The rules used for an offering can be defined by terms and conditions of the manufacturer or seller of the computer system, as well as by the customers desire to self-impose limits. If a certain rule is not in effect for an offering, this means this part of the offering is unlimited (used e.g. for specifying that a record can be activated an unlimited number of times).

Using this flexible certificate structure, new offerings can be easily generated by new combinations of existing rules, also without having to change the firmware of the computer system.

All the different control instances that are distributed across the computer system in the state of the art (e.g. number of activation days), order system (permanent to temporary capacity ratios), and back-end processing (expiration grace periods) can now be consolidated in one central control instance, that is, the temporary entitlement certificate. This means that a great number of Terms and Conditions of an offering are now directly and automatically controlled by the machine, rather than in the back-end processing and without relying on human audit.

Various methods to limit the temporary capacity entitlement can be used. For example, fixed processor counts or capacity settings for the target configuration can be used. But it is also possible to specify a range of target configurations that is automatically adjusted when the permanent configuration changes.

For example, an entitlement limit is the IBM System z MSU (Millions of Service Units) percentage. By using a percentage of the permanent configuration value rather than a fixed number, the range of possible target configurations is automatically adjusted after changes in the permanent machine capacity. Another example is the number of CP feature codes. A CP feature code limits the number of processors and/or speed changes relative to the permanent configuration.

A version control is provided for the temporary entitlement records allowing adding new rules or changing the meaning of existing rules for future computer systems, if needed.

Figure 7:
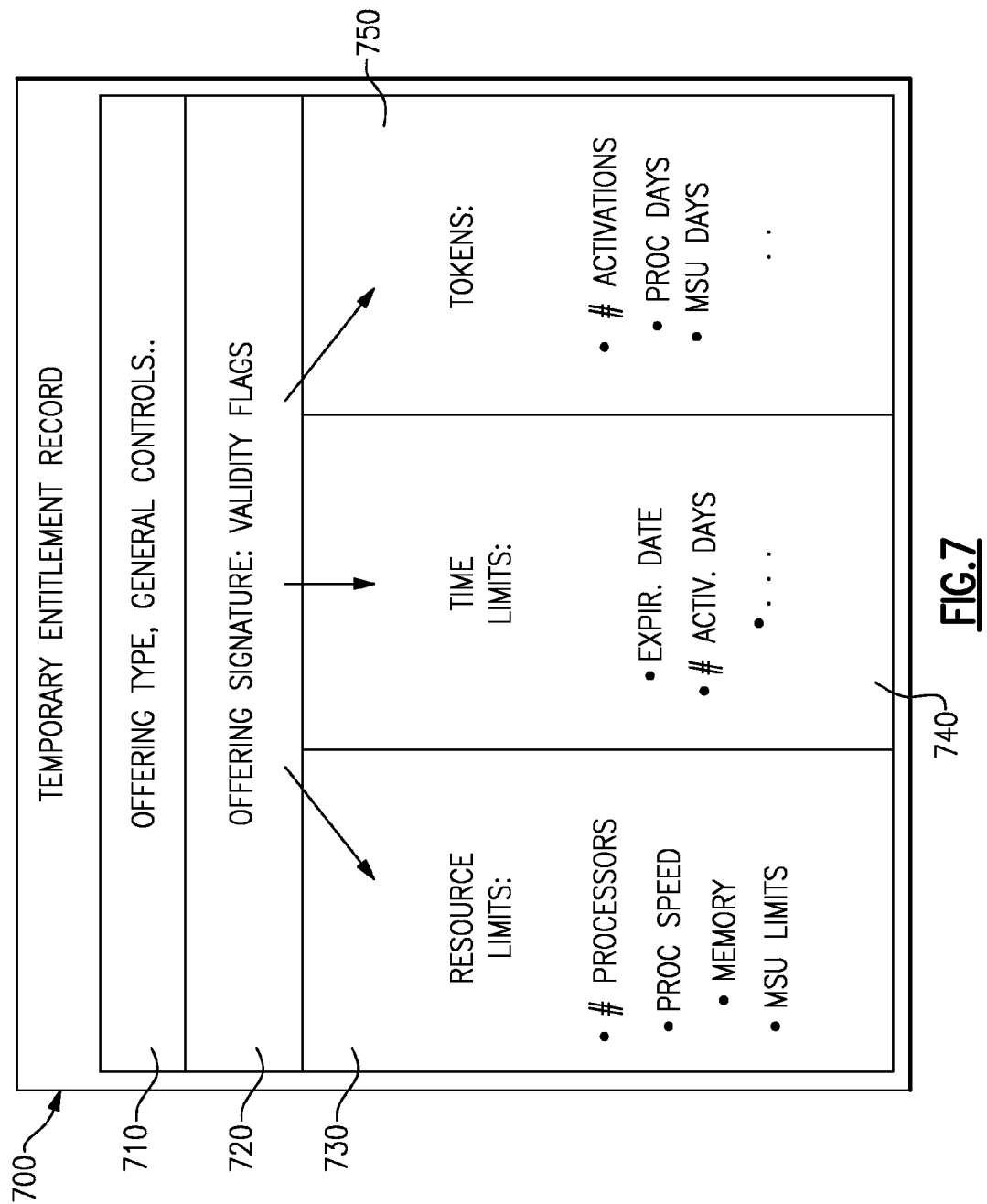
FIG. 7: Is a block diagram illustrating a temporary entitlement record.

FIG. 7 illustrates a temporary entitlement record 700 in accordance with the invention. The entitlement record 700 comprises a system serial number in a field 710, which contains data about the offering type and other general control information. The actual entitlement data of the temporary entitlement record 700 is contained in the offering signature 720. For example, the offering signature 720 is a 64 bit field containing flags indicating the validity of the entitlement data, the offering type and other offering flags. It further comprises a resource limit field 730, a time limits field 740, and a tokens field 750. The tokens field 750 is used to store tokens according to IPCOM000139433D. Especially, it stores data such as the number of activations for a temporary entitlement record, and usage dependent entitlements, e.g. the number of processing days and the number of MSU days. The time limits field 740 stores data such as the expiration date and the number of activation days. The resource limits field 730 stores data such as the number of processors, the MSU limits, and the speed of the processors and the amount of memory.

Activation of Temporary Capacity

Capacity from a temporary entitlement record can be activated either by manual action (via panels on a user console of the computer system) or via automation products that use application programming interfaces provided by the computer system. In both cases a data structure called activation level is received by the firmware of a computer system. This activation level contains a record identifier for the temporary capacity entitlement record from which resources should be activated, and information about the number and type of resources or other types of computer system capacity that should be activated.

Figure 8:
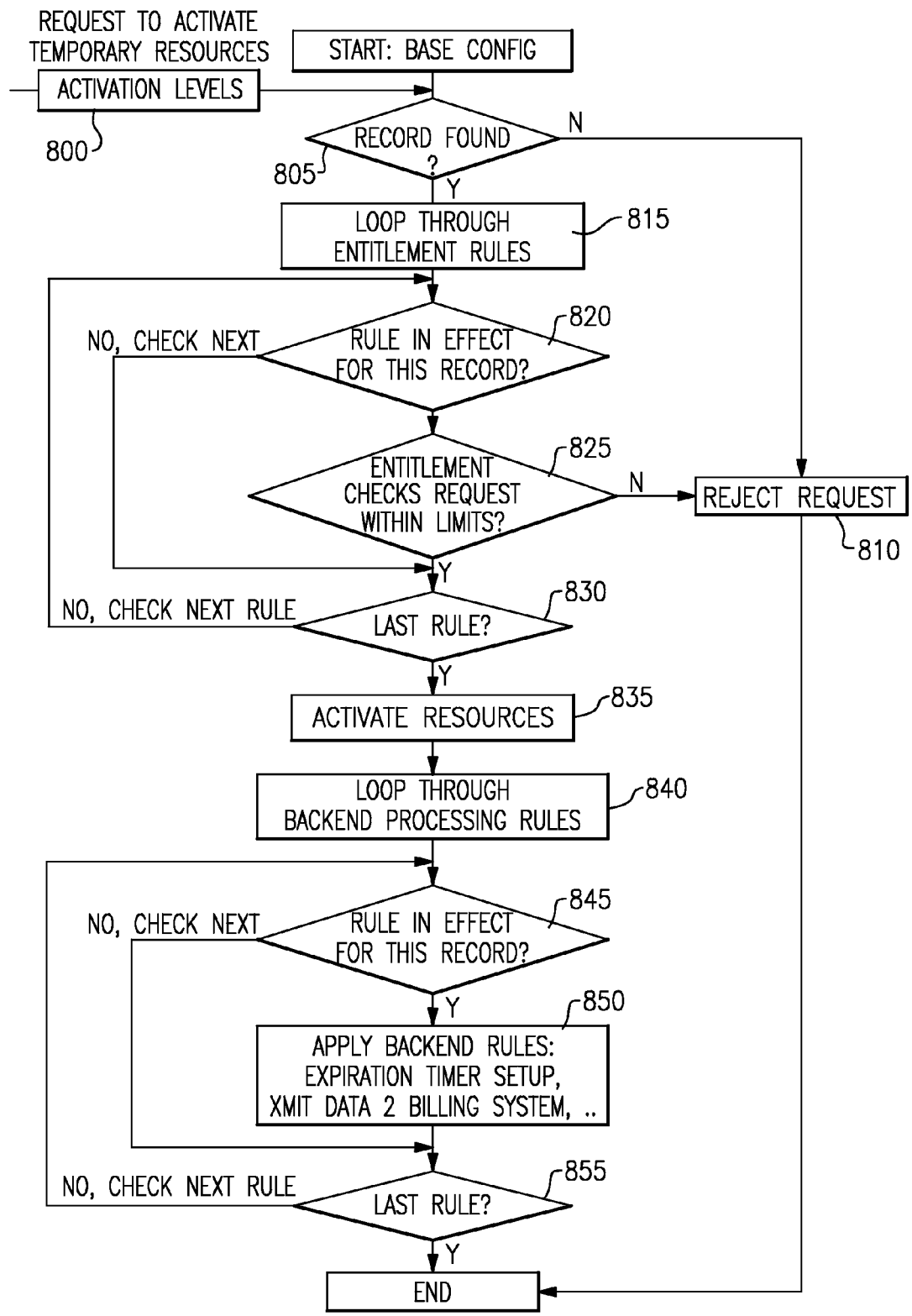
FIG. 8: Is a flow diagram illustrating a method to activate temporary capacity according to the invention.

The firmware of the computer system acts as a secure mechanism to import and control the activation request as illustrated in FIG. 8. When the firmware receives an activation level 800, it first checks in step 805 whether the corresponding entitlement record can be found in the non-volatile storage of the computer system. If not, the request is rejected immediately in step 810. The matching of an activation level with its corresponding temporary entitlement record is achieved by its unique record identifier.

If a matching entitlement record can be found, the firmware proceeds with step 815. The firmware does not need to know what type of offering is being processed. It just loops through all rules in the record, and compares the request specified within the activation level with the entitlement limits in the temporary capacity entitlement record.

The looping through all the rules in the temporary entitlement record is shown in more detail in FIG. 8. In step 820 it is determined, based on the offering signature, if the current rule is in effect for the temporary entitlement record. If not, the firmware continues with step 830. Otherwise, it is determined in step 825 if the request is within the allowed limits. Limiting factors could be record expiration conditions, maximum number of resources of a given type exceeded, or not enough tokens left in the token pools to satisfy this request. If any of the entitlement checks fails, the entire activation request is rejected in step 810. In step 830 the firmware determines now if all rules have been processed already. If not, the next rule will be processed in step 820.

If all entitlement checks have been passed, the requested resources are activated in step 835. After activation of these resources, the firmware loops through the rules again in step 840 and checks what back-end processes need to be started (e.g. decrement tokens in the entitlement record in non-volatile machine storage, setup timers to control expiration conditions, transmit certain data to the billing system, etc.). In step 845 the firmware determines again, if the current rule is in effect for the temporary entitlement record. If not, then the firmware continues with step 855. Otherwise, the firmware determines in step 850, which backend processed need to be started. Then in step 855 the firmware determines if all the rules have been processed for the entitlement record. If not, the next rule will be processed in step 845.

Multiple Temporary Capacity Offerings

Figure 9:
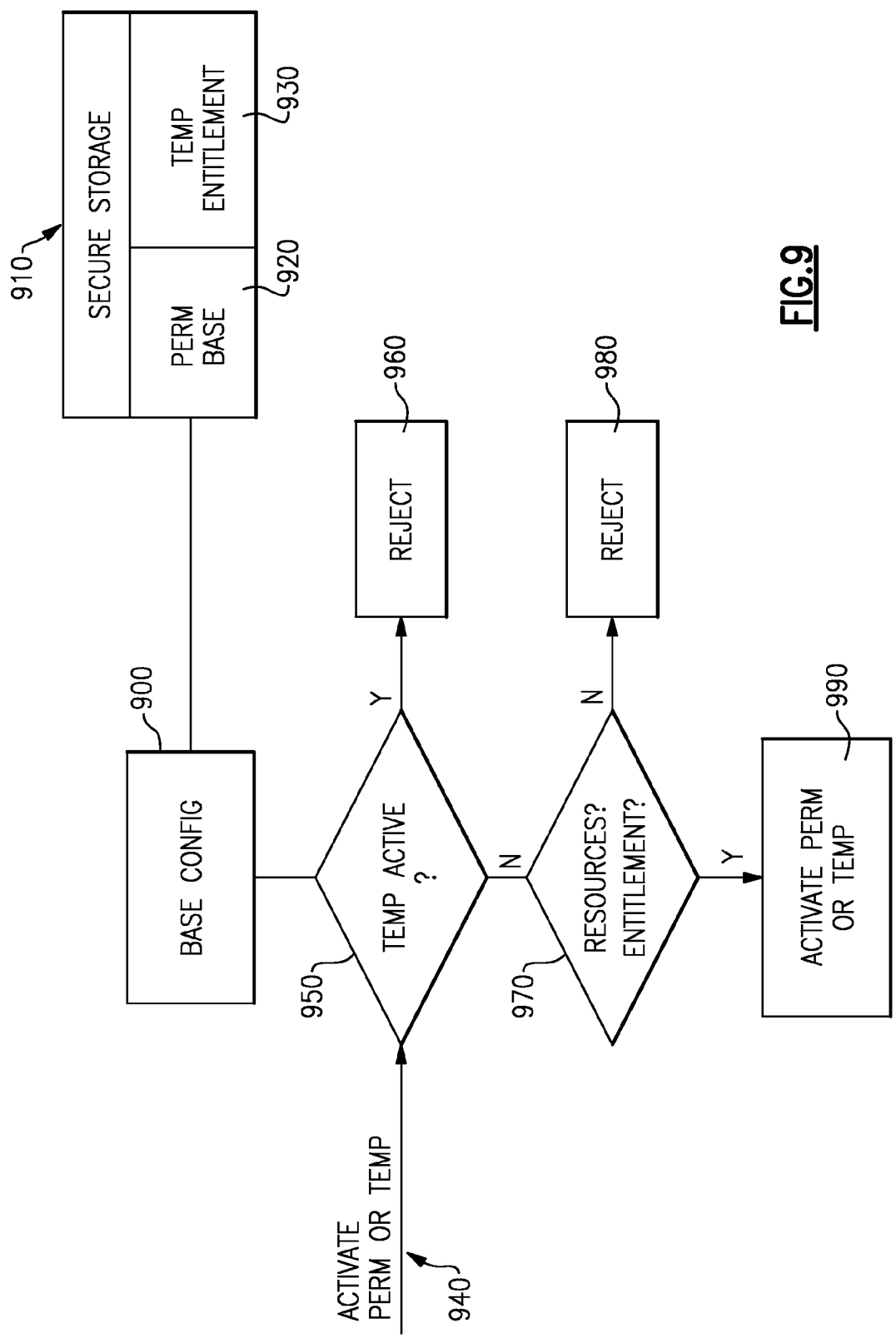
FIG. 9: Is a flow diagram illustrating a method to activate temporary capacity.

As described above, permanent and temporary capacity is under control of entitlement records. As shown in FIG. 9 for a base configuration 900 of a computer system, the permanent entitlement record 920 and one temporary entitlement record 930 are stored in a secure storage 910. But different temporary entitlement records with different terms and conditions for different purposes could be defined, e.g. one for backup capacity to be used for disaster recovery, and another one to be used for workload peaks.

These temporary entitlement records are mutually exclusive, i.e. while a backup capacity record is active, no peak workload capacity can be activated, or vice versa. This dramatically restricts the way a customer can use his computer system as in the current System z computer systems only one temporary capacity record can be activated at a time. That is, when a computer system is used for regular production workload and also for reserve backup capacity, and temporary capacity is active to cover peak workloads, in a case of disaster of another computer system, there is no means to activate backup capacity without turning off the peak workload capacity first.

FIG. 9 illustrates the processing of a request 940 to activate permanent or temporary capacity by the firmware of the computer system according to the state of the art. In case a temporary entitlement record is already active (step 950), the request 940 is rejected in step 960. Otherwise it will be determined by the firmware in step 970 if sufficient resources are available to fulfill the request 940. If not, the request 940 will be rejected in step 980. Otherwise the permanent or temporary capacity will be activated in step 990 as requested by the request 940.

Figure 10:
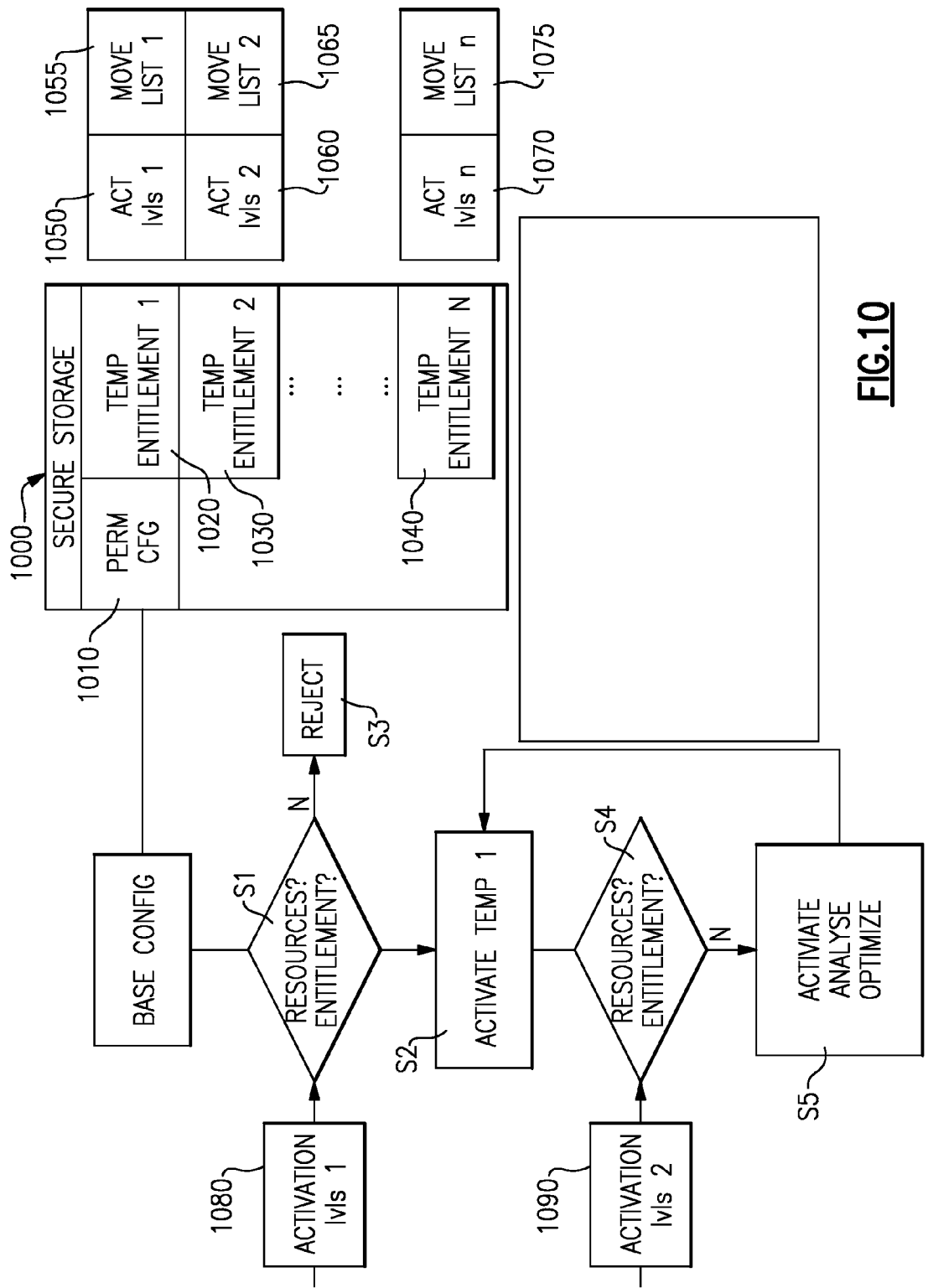
FIG. 10: Is a flow diagram illustrating a method to activate temporary capacity.

FIG. 10 shows a flow diagram illustrating a method to activate temporary. A non-volatile secure storage 1000 of the computer system comprises the data 1010 for the permanent configuration of the computer system, and entitlement data 1020, 1030, and 1040 associated to the temporary capacity upgrades, which is derived from the temporary entitlement records.

Also, in order to assist the customer in selecting the activation possibilities, for the entitlement data 1020, 1030, 1040 and their associated activation levels 1050, 1060, 1070 there is an associated valid movement list 1055, 1065, 1075 that shows at any given time all activation possibilities for the associated entitlement data based on the record entitlement concerning resource limits, currently available spare resources in the computer system, and taking into account all other concurrently active entitlement records at this time.

The activation levels 1050, 1060, 1070 and the valid movement lists 1055, 1065, 1075 can be stored in secure storage as well, but this is not mandatory since they are not critical entitlement data that is vulnerable to modifications. The valid movement lists 1055, 1065, 1075 can be recalculated at any given time, and the activation levels 1050, 1060, 1070 can be restored via panel actions or system management automation.

When a temporary entitlement record is installed in the computer system as described above, its firmware calculates the initial list of valid movements for this entitlement record and stores it. This is done by looping through all activation variations for this entitlement record, first filtering out all the positions that are not reachable because of insufficient record entitlement, and then filtering out all the positions that are not reachable because the machine does not have enough spare resources to activate the desired position. Especially, it needs to be ensured that all temporary entitlement records can be activated and deactivated in any order, so that all movements that would leave another currently active temporary entitlement record in a state where it can not be deactivated any more have to be filtered and must not appear in the list of valid movements.

This list can be generated in a 2-step approach for example. First, the computer system firmware loops through all possible configurations (which are a combination of number of processors and sub-capacity settings) of the computer system model. It then determines which delta in terms of processors and speed needs to be applied to the permanent computer system configuration (not considering other currently active temporary entitlement records) to reach the target configuration. These delta values are then checked against the temporary entitlement record limits. Delta values that exceed the temporary entitlement record limits are filtered out of this list. In a second step, the remaining list of delta values are checked against the current computer system configuration including the activation levels of all other currently active temporary entitlement records, and it is checked if enough spare resources are available in the computer system to apply those delta values to the current computer system configuration, or if applying these delta values would either result in a non-existent computer system configuration (e.g., due to exceeding the maximum sub-capacity speed setting for a computer system) or if it would leave other temporary entitlement records in a position where they can not be deactivated any more. If any of these conditions is true, the corresponding delta values are filtered out of the list. The remaining list of delta values comprises the list of valid movements for a temporary entitlement record.

When the first entitlement record with the associated entitlement data 1020 gets activated, the firmware of the computer system receives an activation request command. This contains a requested activation level 1080 structure that describes the desired target configuration. In step S1 the firmware of the computer system searches for the corresponding temporary entitlement record, and first checks that the request does not exceed the entitlement data of the temporary entitlement record. Then it checks whether enough spare resources are available to satisfy the request.

If all checks passed, the requested resources are activated in step S2, and the activation levels 1050 in the storage of the computer system is updated for this entitlement record. Then, the valid movement list 1055 is recalculated. Otherwise, the activation request is rejected in step S3.

When a second activation request and its activation level 1090 for another entitlement record with the associated entitlement data 1030 is received by the firmware, then in step S4 the firmware first checks again for the proper entitlement. Then it checks for available resources, and in step S5 it performs the actual activation. When the request was successful, it further checks in step S5 whether resources should be redistributed between the activation levels for the first and the second entitlement record. After the redistribution, the firmware writes the adjusted activation level 1060 for the changed record back into storage of the computer system. Also, the valid movement list 1065 is recalculated to reflect the current configuration of the computer system.

The same adjustment of activation levels and valid movement lists is performed for permanent model changes as well as for deactivations, for example to pick up pending resources for forced activation requests as described above. Also after activation, secure billing data is generated according to the rules in the entitlement record and sent to the billing system.

Location Awareness

Figure 11:
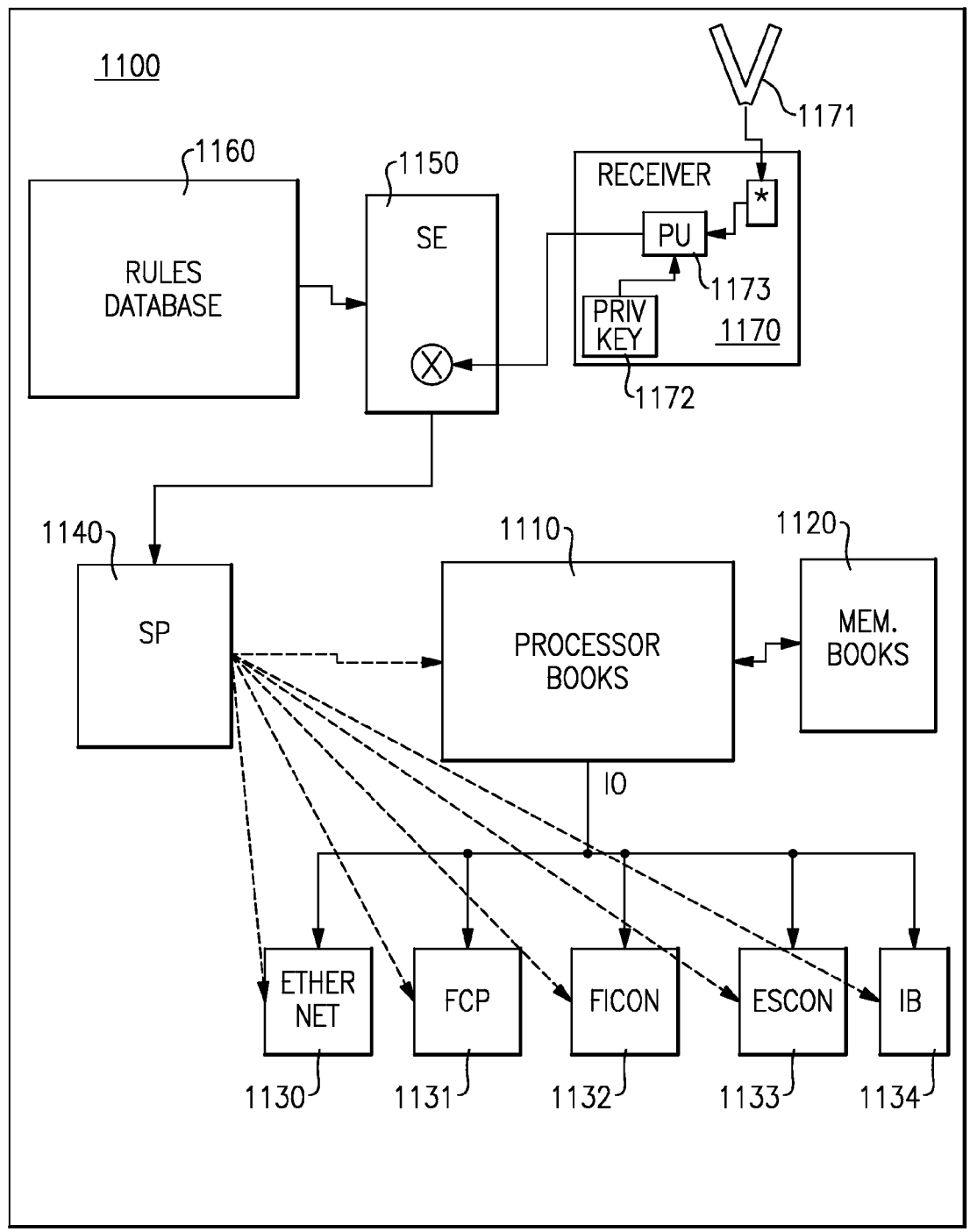
FIG. 11: Is a block diagram of a system in which certain embodiments may be implemented.

FIG. 11 shows a computer system 1100 in which the preferred embodiment of the invention can be implemented. The computer system 1100 consists of the following physical resources: a number of processor books 1110 that are characterized by their number and their performance (speed setting), a number of memory books 1120, and a number of I/O adapters. The I/O adapters include Ethernet adapters 1130, FCP (Fibre Channel Protocol) adapters 1131, HCON (Fibre Connection) adapter 1132, ESCON (Enterprise System Connection) adapters 1133, and IB (Infiniband) adapters 1134. The books 1110, 1120 and I/O adapters 1130, 1131, 1132, 1133, 1134 are controlled by a support processor (SP) 1140, for example using a special internal support interface. The support processor 1140 is controlled by a service element (SE) 1150, e.g. via an Ethernet connection. An example for such computer system 1100 is described in F. Baitinger et al "System control structure of the IBM eServer z900", IBM J. RES. & DEV. VOL. 46 NO. 4/5 JULY/SEPTEMBER 2002.

The service element 1150 maintains a rules database 1160, which specifies system and/or location specific rules for enabling system resources and functions. Further, the service element 1150 is connected to a receiver 1170. Preferably, the service element 1150 comprises the receiver 1170. In an alternative embodiment, the service processor 1140 is connected to and comprises the receiver 1170 instead of the service element 1150.

The receiver 1170 is connected to an antenna 1171. Preferably, the receiver 1170 comprises the antenna 1171. Further, the receiver 1170 comprises a private key 1172 stored in a tamper protected storage and a processing unit (PU) 1173. The receiver 1170 can determine its local position using a dedicated service via signals received from the antenna 1171. Examples for such services are the Global Positioning Signal (GPS) system or a Global System for Mobile Communication (GSM). Also combinations of GPS and GSM as e.g. described in U.S. Pat. No. 7,257,416 are possible. Preferably, the receiver uses GPS signals to determine the local position, which will be sent to the service element 1150 as latitude/longitude/height coordinates, e.g. N 48.38745°/E 8.56794°/512.4 m. An implementation for a GPS based controller is described for example in U.S. Pat. No. 6,928,339 B2.

Before the receiver 1170 sends the local position information to the service element 1150, it is encrypted by the processing unit 1173 using the private key 1172. Preferably, the RSA (Rivest Shamir Adleman) algorithm is used for the encryption of the local position information. The service element 1150 receives the encrypted local position information and passes it on to a firmware component that is interpreting the rules database 1160 and controlling the actual enablement of the system resources. This firmware component can either run on one of the processors of the processor books 1110 which has in-band control to other processors, I/O, memory, or other resources/functions of the computer system 1100, or run on the service element 1150 which can control these computer system resources/functions out of band.

The firmware component receives the local position information and decrypts it using the public key corresponding to the private key 1172. If the decryption fails, or unencrypted information is received from the service element 1150, this is treated as invalid local position information.

The rules database 1160 is stored in a non-volatile storage of the system element 1150, e.g. on an integrated hard disk. The rules database 1160 is generated and installed during manufacturing of the computer system 1100. The rules database 1160 can be changed by the service element 1150 later on by receiving new data from the computer manufacturer and/or seller. Such data can be provided to the service element 1150 using a network connection to a server system and/or using computer-readable media.

As shown in FIG. 12, the rules database 1160 comprises a number of rules 1200. Each rule consists of a function field 1210, position information field 1220, a violation rules field 1230, and a function enablement indicator field 1240. The function enablement field 1240 indicates whether the function/resource is enabled in the computer system 1100. The function field 1210 consists of entitlement data describing the function/resource enabled by the rule 1200. In the preferred embodiment of the invention, the entitlement data is implemented and processed in form of permanent and temporary entitlement records as described above. Examples for description data are the name of a specific resource of the computer system 1100 such as the System z Crypto function, the maximum number and speed of processors of each type that may be enabled on the computer system 1100, the maximum number and type of I/O adapters that can be enabled, the maximum memory size allowed, certain other performance measures, etc.

The position information field 1220 comprises either an indication that the rule 1200 is position independent, i.e. the feature is enabled on all computer systems, or specific location information for the rule 1200. Example location information data are the coordinates of the current local position plus a certain radius, a map area, etc. Preferably, the map area defines state boundaries. For example, this allows the manufacturer and/or seller of the computer system 1100 to be compliant with export regulation laws in case a certain function may only be enabled within the state boundaries of one or more countries, e.g. the member states of the European Union. Further, it allows preventing a resale of the entire computer system 1100 from a market with cheaper prices to a market with higher prices. Another potential application is to bind the functionalities/resources of a computer system to a dedicated customer, hence allowing price reductions for this customer without compromising the overall price structure for the product in the market.

If a function/resource is enabled in the computer system 1100 but the corresponding requirements (e.g. the location) are not met, certain penalty rules can be applied. Example penalties are the disablement of the function, possibly after a certain time delay, an alert to be sent to the manufacturer and/or seller, penalty billings, etc. The violation rules field 1230 comprises the applicable penalties for the rule 1200.

The functions/resources of the computer system 1100 can be classified in:

Basic functions/resources, which are always enabled, independent of the specific entitlement data and independent of current local position of the computer system 1100;

Functions/resources enabled based on the entitlement data but independent of the current local position of the computer system 1100;

Functions/resources enabled based on the entitlement data but dependent on the current local position of the computer system 1100.

The receiver 1170 can belong to either of the first two classes. The functions/resources, which are enabled based on the current local position, are only enabled if valid local position information is available and matches the rules for this specific function/resource in the rules database 1160. The functions/resources do not necessarily need to be physical resources in the computer system 1100. Any feature of a computer program executed on the computer system 1100 can be chosen. Such features can be enabled or disabled based on a rule 1200. A standardized application programming interface (API) can be provided, which is shared between the various computer programs executed on the computer system 1100. Via this API, the rules database 1160 can be modified and queried in order to enable support for additional features, which are not defined and controlled by the manufacturer and/or seller of the computer system 1100.

Since the location information in the rules database 1160 generated by the manufacturer and/or seller is typically in a granularity defining country/state or even continent boundaries, the user of the computer system 1100 can optionally specify his own rule databases to get better granularity for the location information in an embodiment of the invention. Also, the rules database 1160 can optionally be further refined by area specific policies defined by the user himself, e.g. location specific power consumption considerations for a specific building on a site (e.g., power cost or heat considerations), location specific performance requirements, etc.

Figure 14:
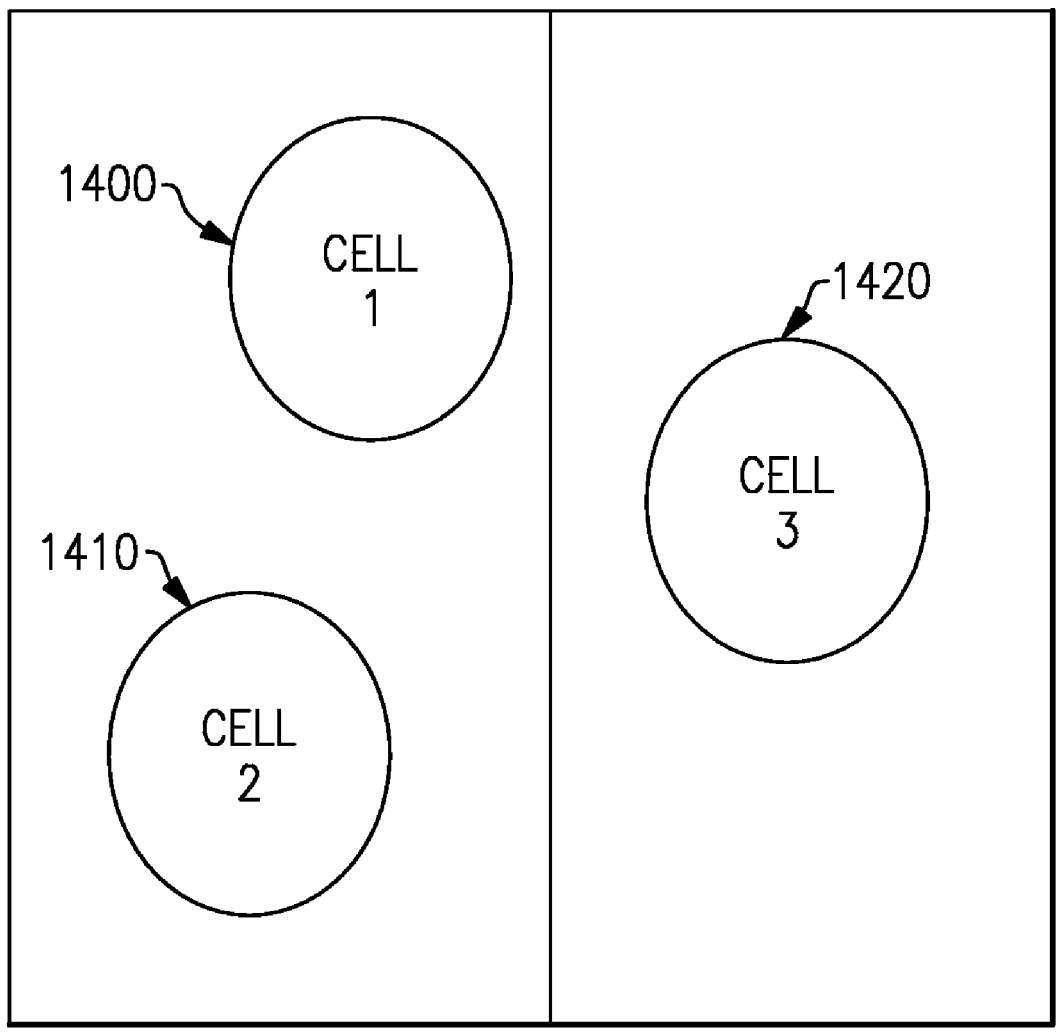
FIG. 14: Is a block diagram of an example cell distribution.

This is illustrated in FIG. 14. In country A, the user defines a first cell 1400 and a second cell 1410, and in country B a single third cell 1420. The cells 1400, 1410, 1420 do not overlap and cover a part of the territories of the respective countries only. This allows to model zones and localities as described e.g. in US 2003/0008661 A1. Further possible applications can be based on distributed computing services such as clustering, wherein other computer systems in the neighborhood of a computer system are integrated.

Activation or enablement of resources/functions in the computer system 1100 can not only be triggered by the initial setup, but also later during machine runtime by system automation software like workload managers which can activate resources/functions based on policies and goal fulfillment, within the rules of the rules databases. This means part or all of the resources/functions that are allowed according to the rules database could be activated. On each activation request the machine firmware would verify the request against the entitlement rules in the rules database, taking into account the current local position. If valid local position information is not available or the request exceeds the entitlement rules, the request is rejected.

Figure 13:
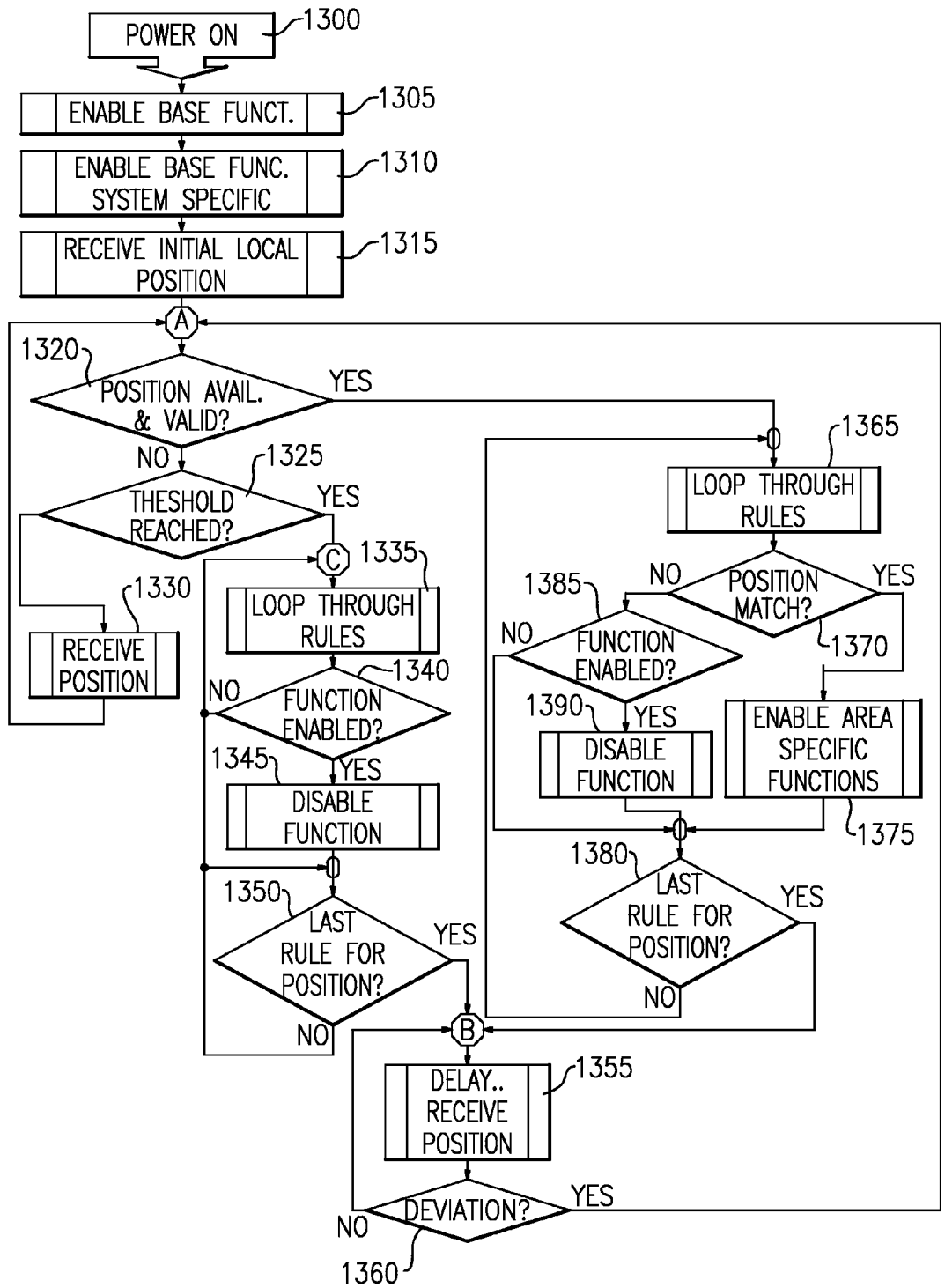
FIG. 13: Is a flow diagram illustrating a method in accordance with the present invention.

FIG. 13 shows the control flow executed by the firmware component. After the power-on 1300 of the computer system 1100 its base functions are enabled independent of the content of the rules database 1160. Then the resources/functions, which are independent of the current local position of the computer system 1100 are enabled as described in the previous sections in steps 1305 and 1310. In step 1305 generic resources/functions are enabled, for which no entitlement data is needed, whereas in step 1310 the resources/functions are enabled, for which entitlement data is needed. The receiver 1170 must be functional now and provide valid local position information to the service element 1150.

In step 1315 the service element receives initial local position information from the receiver 1150. Then it will be checked in step 1320 if valid position information is received. The validity is determined via the decryption using the public key. For example, invalid position information can be caused by the disconnection of the receiver 1170 from the service element 1150 or by connecting an unsupported receiver, which does not contain a supported private key. If no valid position information was received, then it will be checked in step 1325 if a certain threshold of unsuccessful receive operations was already reached. If the threshold is not exceeded, then new local position information will be received in step 1330. Subsequently, step 1320 will be performed again.

If the threshold is already exceeded, then the firmware component will loop through all rules in the rules database 1160 in step 1335. In step 1340 it will be determined if the resources/functions specified by the current rule are already enabled. If so, then these resources/functions will be disabled and the violation rules specified by the current rule will be processed in step 1345. In step 1350 it will be determined if the current rule is the last rule in the rules database 1160. If not, then the next rule will be processed in step 1335. Otherwise, after a predefined delay, the firmware component receives local position information again in step 1355. Then in step 1360 it will be determined, if a deviation from the previous local position information occurred. If not, then step 1355 will be performed again. Otherwise the firmware component continues the execution with step 1320 as described above.

If, in step 1320, it is determined that the received local position information is valid, then the firmware component loops through all the rules in the rules database 1160. Then it will be tested in step 1370 if the local position information field of the current rule matches the current local position. If that is the case, then the resources/functions specified by the current rule will be enabled in step 1375. Then it will be determined in step 1380 if the current rule is the last rule in the rule database 1160. If not, then the firmware component continues with step 1365 as described above. If the local position field does not match the current local position, then it will be checked in step 1385 if the resources/functions specified by the current rule are already enabled. If not, the firmware component continues with step 1380. If the resources/functions are already enabled, then they will be disabled and the violation rules in the current rule will be performed in step 1390. Then the firmware component continues with step 1380.

If it is determined in step 1380 that the current rule is the last rule in the rules database 1160, then new local position information is received in step 1355 after a predefined delay. If a deviation to the previous local position information is detected in step 1360, then the firmware component continues to re-evaluate the rules in the rules database 1160 in step 1320 for this new local position information as described above. For example, a deviation from the previous local position information can be declared if the new and the previous coordinates are more than twice the tolerance of a GPS position signal with a certain quality and sufficient satellites in view. If no new local position information is received, this can be handled either in step 1360 as the detection of a deviation or step 1320 as invalid local position information.

If no deviation from the previous position information and no invalid local position information are received, then the firmware component is in a steady state and will not change the enablement of the resources/functions in the computer system 1100. In this steady state the firmware component continues to periodically receive local position information and check for deviation and invalid local position information in order to decide whether the rules in the rules database 1160 need to be re-evaluated.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), digital versatile disc-ROM (DVD-ROM), DVD-RAM, Blue-ray disc RAM (BD-RAM), BD-ROM.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 15:
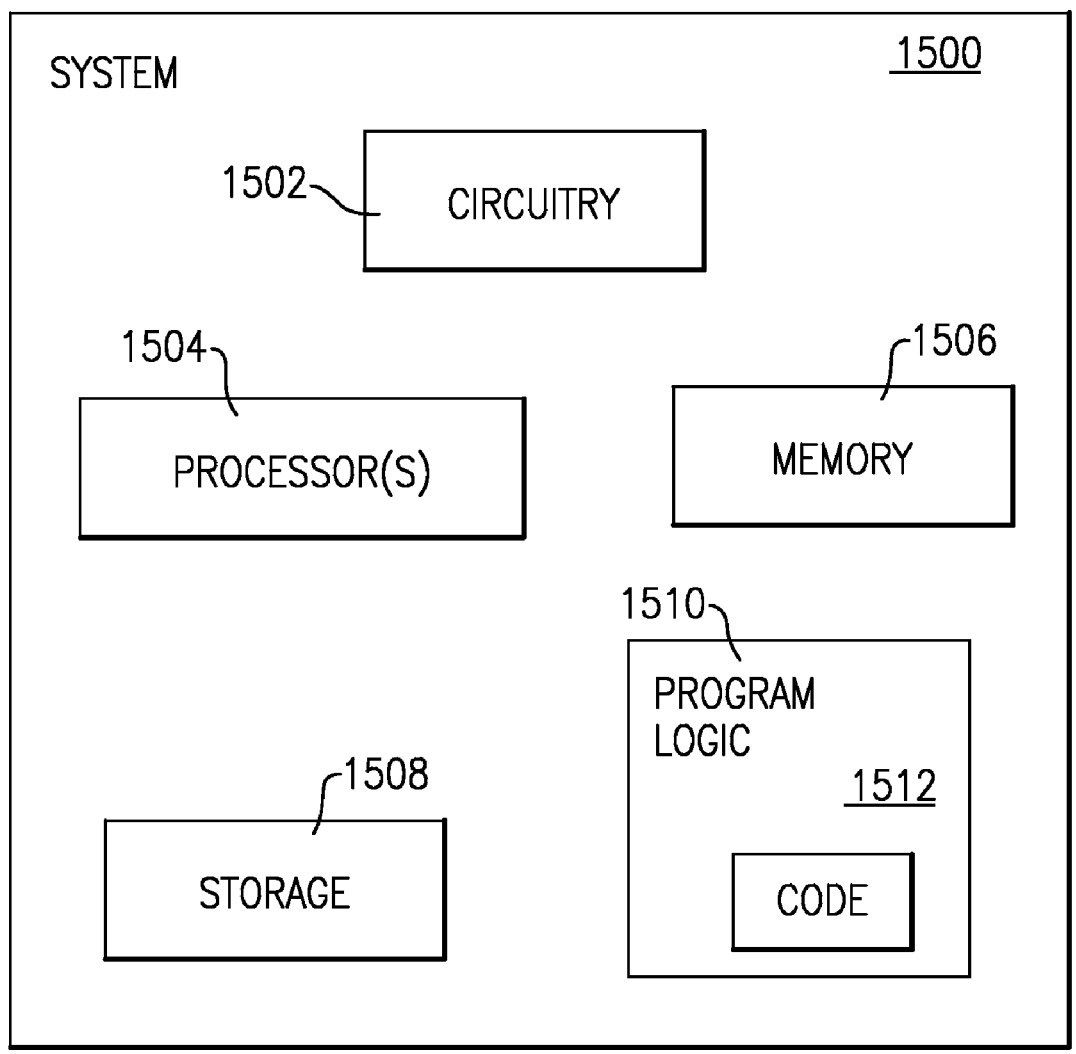
FIG. 15: Is a block diagram of a system in which certain embodiments may be implemented.

FIG. 15 illustrates a block diagram of a computer system 1500 in which certain embodiments may be implemented. The system 1500 may include a circuitry 1502 that may in certain embodiments include a microprocessor 1504. The computer system 1500 may also include a memory 1506 (e.g., a volatile memory device), and storage 1508. The storage 1508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 1508 may comprise an internal storage device, an attached storage device and/or a network accessible storage device. The system 1500 may include a program logic 1510 including code 1512 that may be loaded into the memory 1506 and executed by the microprocessor 1504 or circuitry 1502. In certain embodiments, the program logic 1510 including code 1512 may be stored in the storage 1508. In certain other embodiments, the program logic 1510 may be implemented in the circuitry 1502. Therefore, while FIG. 9 shows the program logic 1510 separately from the other elements, the program logic 1510 may be implemented in the memory 1506 and/or the circuitry 1502.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in the figures may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in the figures and the description are described as having specific types of information. In alternative embodiments, the data structures and components may be structured differently and have fewer, more or different fields or different functions than those shown or referred to in the figures.

Therefore, the foregoing description of the embodiments has been presented for the purposes of illustration and description. It is not intended to be exhaustive or to limit the embodiments to the precise form disclosed. Many modifications and variations are possible in light of the above teaching.

The invention claimed is:

1. A method for configuring functional capabilities in a data processing system comprising entitlement data in a non-volatile storage, the method comprising:
    determining the position of said data processing system;
    based on said position, changing functional capabilities based on position information comprised in said entitlement data, wherein changing is selected from the group consisting of enabling, disabling, and a combination thereof; and
    wherein said entitlement data comprises at least one flag, a resource limit field, a time limit field, and a token field.

2. The method of claim 1, wherein, in the determining step, Global Positioning Signal (GPS) services are used.

3. The method of claim 1, wherein, in the determining step, or a Global System for Mobile Communication (GSM) services are used.

4. The method of claim 1, wherein the disabling is controlled by violation data in said entitlement data.

5. The method of claim 4, wherein an alert is generated if specified by said violation data.

6. The method claim 4, wherein the disabling is delayed by an amount of time if specified by said violation data.

7. The method of claim 4, wherein a penalty billing request is generated if specified by said violation data.

8. The method of claim 4, wherein functions are disabled based on said violation data.

9. The method of claim 4, wherein resources are disabled based on said violation data.

10. The method of claim 1, wherein said position is provided in encrypted form by a receiver and wherein the validity of said position is determined based on the success of the decryption of said position.

11. The method of claim 1, wherein the changing step is controlled by system automation software.

12. The method of claim 11, wherein said system automation software can modify said entitlement data.

13. The method of claim 1, wherein the changing step is mainly performed by a firmware component of said data processing system.

14. A computer program product for configuring functional capabilities in a data processing system comprising entitlement data in a non-volatile storage, the computer program product comprising:
    a computer usable medium having computer usable program code embodied therewith, the computer usable program code comprising computer usable program code configured to:
        determining the position of said data processing system;
        based on said position, changing functional capabilities based on position information comprised in said entitlement data, wherein changing is selected from the group consisting of enabling, disabling, and a combination thereof; and
        wherein said entitlement data comprises at least one flag, a resource limit field, a time limit field, and a token field.

15. A device for configuring functional capabilities in a data processing system, said data processing system comprising:
    entitlement data in a non-volatile storage, wherein said entitlement data comprises at least one flag, a resource limit field, a time limit field, and a token field;
    position detecting means for determining the position of said data processing system; and
    means responsive to said position detecting means for changing functional capabilities based on position information comprised in said entitlement data, wherein changing is selected from the group consisting of enabling, disabling, and a combination thereof.

16. The device of claim 15, wherein said position detecting means comprise a private key in a tamper-resistant non-volatile storage; and wherein the device further comprises means for encrypting said position with said private key.

17. The method of claim 15, wherein the disabling is controlled by violation data in said entitlement data.

18. The method of claim 15, wherein said position is provided in encrypted form by a receiver and wherein the validity of said position is determined based on the success of the decryption of said position.

19. The method of claim 15, wherein the changing step is controlled by system automation software.

20. The method of claim 15, wherein the changing step is mainly performed by a firmware component of said data processing system.

* * * * *